United States Patent

Sternberger

[11] Patent Number: 5,915,765
[45] Date of Patent: Jun. 29, 1999

[54] OPPOSING HOOK LATCH

[75] Inventor: Joe E. Sternberger, Wichita, Kans.

[73] Assignee: The Boeing Company, Seattle, Wash.

[21] Appl. No.: 09/044,192

[22] Filed: Mar. 17, 1998

[51] Int. Cl.$^6$ .................................................. B65D 45/30
[52] U.S. Cl. ............................. 292/256.69; 292/DIG. 49; 24/68 R; 24/68 CT; 24/270
[58] Field of Search ................................ 292/26, 29, 113, 292/256.65, 256.69, DIG. 49, 5–8, 66; 254/113, 384; 244/54, 129.1, 129.4; 24/69 CF, 69 ST, 68 R, 70 CT, 71 T, 71 ST, 71 CT, 68 CT, 69 T, 69 WT, 270, 273

[56] References Cited

U.S. PATENT DOCUMENTS

| 889,042 | 5/1908 | Powers . | |
|---|---|---|---|
| 1,460,235 | 6/1923 | Fischer . | |
| 1,716,113 | 6/1929 | Carlson . | |
| 1,766,366 | 6/1930 | Welch . | |
| 2,703,431 | 3/1955 | Tatom . | |
| 4,385,423 | 5/1983 | Vermilye . | |
| 4,538,843 | 9/1985 | Harris . | |
| 4,549,708 | 10/1985 | Norris . | |
| 4,557,441 | 12/1985 | Aspinall . | |
| 4,705,308 | 11/1987 | Bisbing | 292/108 |
| 4,858,970 | 8/1989 | Tedesco et al. . | |
| 5,035,379 | 7/1991 | Hersen et al. . | |
| 5,068,946 | 12/1991 | Marescot et al. . | |
| 5,076,514 | 12/1991 | Melcher . | |
| 5,197,695 | 3/1993 | Andersson et al. . | |
| 5,518,206 | 5/1996 | Arnold et al. . | |

Primary Examiner—Steven Meyers
Assistant Examiner—Gary Estremsky
Attorney, Agent, or Firm—Christensen O'Conner Johnson & Kindness PLLC

[57] ABSTRACT

A latch assembly (20) for securing opposed catches (24), (24') is provided. The latch includes a housing (32); a stationary center link (34); first and second elongated links (36, 38); first and second intermediate links (40, 42); and first, second, and middle crosspins (44), (46), (48). The housing includes opposed upright side walls (52), (54) each including first and second cam slots (58), (60). The center link includes an upright slot (56). The first and second elongated links each include distal and proximal ends (70), (74) and (68), (72). The distal ends each include a hook (22), (22'). Each elongated link further includes an L-shaped slot (86), (88) located between the link's distal and proximal ends. The first and second intermediate links each include distal and proximal ends (92), (96) and (90), (94). The first crosspin (44) is movably interconnected between the housing first cam slot (58), the left elongated link L-shaped slot (86), the right elongated link distal end (74), and the first intermediate link distal end (92). The second crosspin (46) is movably interconnected between the housing second cam slot (60), the right elongated link L-shaped slot (88), the left elongated link distal end (70), and the second intermediate link distal end (94). The middle crosspin (48) is interconnected between the first and second intermediate proximal ends (90), (94) and the stationary center link upright slot (56). Movement of the middle crosspin along the upright slot causes rotation of the intermediate links and movement of the first and second crosspins in their respective slots, further causing rotation of the left and right elongated links as the first and second crosspins transverse their respective L-shaped slots.

16 Claims, 5 Drawing Sheets

OPPOSING HOOK LATCH

FIELD OF THE INVENTION

The present invention relates to latch assemblies, and more particularly, to latch assemblies used to join opposed arcuate members such as a hoop structure surrounding an aircraft engine.

BACKGROUND OF THE INVENTION

Figure 1:
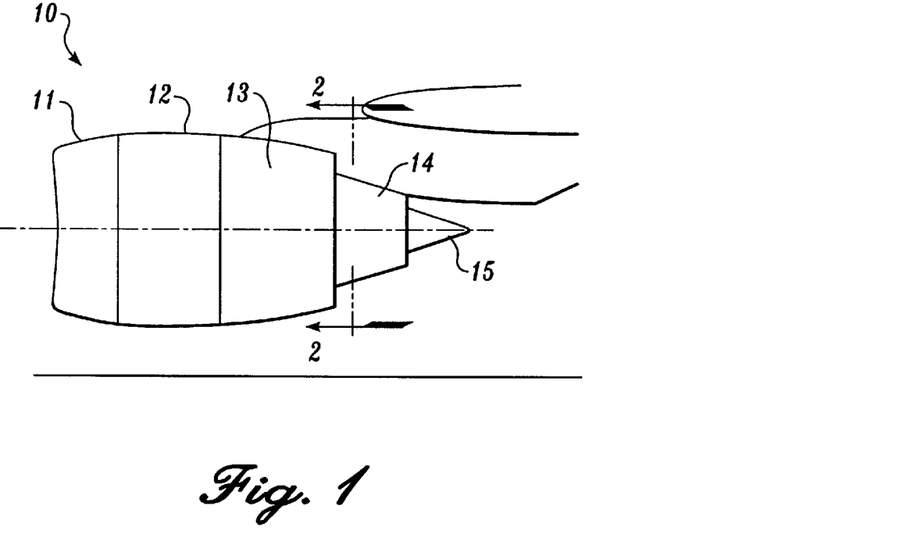
FIG. 1 is a side elevation view of a conventional underwing turbofan aircraft engine.

Shown in FIG. 1 is a side view of a conventional underwing aircraft turbofan engine 10 surrounded by a number of annular members. Shown in FIG. 1 is a nacelle barrel 11, a fan cowl 12, a cascade-type thrust reverser 13, an aft engine cowl 14, and a primary exhaust nozzle cone 15. It frequently occurs that one or more of these annual members are formed of opposed semi-circular portions hinged to an upper strut or support pylon. During maintenance, the opposed halves are rotated outward to allow a mechanic access to the engine.

Figure 2:
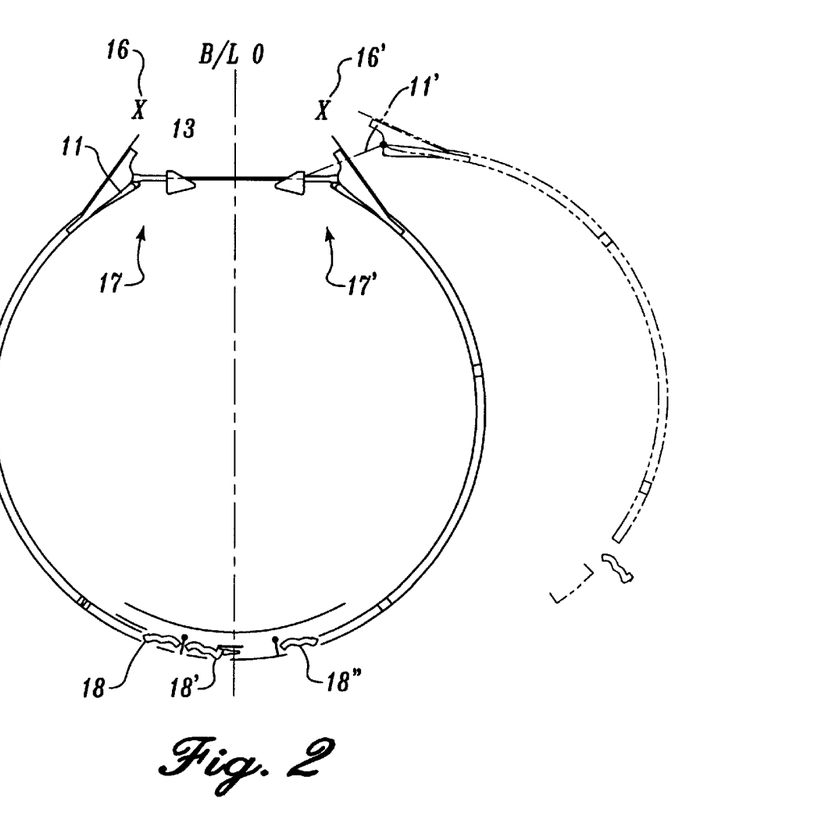
FIG. 2 is a cross-sectional view of portions of the aft cowl shown in FIG. 1, taken along line 2—2 with an open aft cowl half shown in phantom.

FIG. 2 illustrates cross-sectional portions of the aft cowl in FIG. 1. In this configuration, both the aft cowl and the thrust reverser are formed from opposed semi-circular halves, and are additionally connected so as to rotated in unison. During maintenance, each combination rotates about an axis referred to as its thrust reverser hinge line 16, 16' that is located generally above its respective aft cowl half. See FIG. 2.

The configuration of FIG. 2 includes one or more hoop-tie band assemblies 17, 17' contained within each aft cowl half for the purpose of providing a hoop load continuity to the aft cowl when closed. "Hoop load" refers to the load in a continuous object around a circular member or members, e.g., a hoop load would exist in the metal band surrounding the staves of a barrel. In the case of the aft engine cowl halves, the hoop-tie band assemblies include straps or bands 11, 11', a cross-tie link 13, and a number of latches 18, 18', 18". These components form a continuous load path around the aft cowl that is capable of reacting over pressurization of the necelle structure.

The kinematic arrangement required by the thrust reverser hinge line of this particular embodiment, requires the aft cowl hoop-tie bands to travel at a differential rate relative to that of the thrust reverser halves. In a closed position, current configurations requires latching of the hoop-tie band assemblies not only to their respective aft cowl half, but additionally latching of the aft cowl halves together. Still referring to FIG. 2, current cowl designs utilize three separate latches 18, 18', and 18" at each hoop-tie location. There are typically two hoop-tie locations per nacelle, requiring a total of six latches per engine. If any one of these latches is not completely unlatched during maintenance, subsequent opening of a thrust reverser half may cause damage to the hoop-tie assembly and/or the thrust reverser structure.

Thus, a need exists for an improved latch assembly for use in securely joining opposed arcuate members surrounding an aircraft engine, such as the hoop-tie assembly of a nacelle aft cowl. The ideal mechanism would reduce or eliminate the likelihood of damage to the aft cowls and/or thrust reverser structure should the operator attempt to open the thrust reverser without having the aft cowl latches fully opened. The ideal mechanism would further require fewer parts and less work to latch and unlatch. The present invention is directed to fulfilling this need.

SUMMARY OF THE INVENTION

In accordance with aspects of the present invention, a latch assembly is provided for securing opposed catches. The latch includes a housing having an upright side wall, a stationary center link having an upright slot, first and second elongated links each having distal and proximal ends, first and second intermediate links each including distal and proximal ends, and a number crosspins. The housing side wall includes first and second cam slots. The center link is connected to the housing such that the upright slot is located approximately mid-way between the housing first and second cam slots. The elongated link distal ends each include a hook. Each elongated link further includes an L-shaped slot located between the distal and proximal ends. A first crosspin is movably interconnected between the housing first cam slot, the left elongated link L-shaped slot, the right elongated link distal end, and the first intermediate link distal end. A second crosspin is movably interconnected between the housing second cam slot, the right elongated link L-shaped slot, the left elongated link distal end, and the second intermediate link distal end. A middle crosspin is interconnected between the first and second intermediate proximal ends and the stationary center link upright slot. Movement of the middle crosspin along the upright slot causes rotation of the intermediate links and movement of the first and second crosspins in their respective slots further causing rotation of the left and right elongated links as the first and second crosspins transverse their respective L-shaped slots. In a preferred embodiment, movement of the first and second crosspins further causes extension of the second and first elongated links respectively.

In accordance with other aspects of this invention, the latch assembly further includes a handle connected to one of the first and second intermediate links. Movement of the middle crosspin along the upright slot is initiated by rotation of the one of the first and second intermediate links caused by rotation of the handle. In one embodiment, the handle is integrally formed with the second intermediate link.

In accordance with further aspects of this invention, the various links are positioned in a nested arrangement, where the left elongated link includes opposed arms, portions of the right elongated link being located therein. The right elongated link includes opposed arms, portions of the second intermediate link being located therein. The second intermediate link includes opposed arms, portions of the first intermediate link being located therein. The first intermediate link includes opposed arms, portions of the stationary center link being located therein.

In accordance with still other aspects of this invention, the housing includes two opposed upright side walls; and the elongated links, the intermediate links, and the stationary center link are substantially located therebetween. In one embodiment, the opposed upright side walls each have first and second cam slots, and the first and second crosspins engage their respective slots of both upright side walls.

In accordance with still further aspects of this invention, the first and second elongated links include adjusting nuts connected between the distal ends and their respective hooks. The adjusting nuts are available to vary the overall length of the elongated link.

In accordance with yet other aspects of this invention, a latching system for an aircraft hoop-tie assembly having opposed hoop-tie bands is provided. The system includes a latch assembly and opposed catches for engaging the latch assembly. One catch is adapted for connection to one hoop-tie band. The other catch is adapted for connection to the other hoop-tie band. The latch assembly includes a stationary center link having a upright slot; first and second elongated links each having distal and proximal ends; first and second intermediate links each including distal and proximal ends; and first, second, and middle crosspins. The elongated link distal ends each include a hook for engaging a catch. Each elongated link further includes a slot located between the distal and proximal ends. The first crosspin is movably interconnected between the left elongated link slot, the right elongated link distal end, and the first intermediate link distal end. The second crosspin is movably interconnected between the right elongated link slot, the left elongated link distal end, and the second intermediate link distal end. The middle crosspin is interconnected between the first and second intermediate proximal ends and the stationary center link upright slot.

In accordance with yet further aspects of this invention, each elongated links preferably includes an adjusting nut connected to its respective hooks for positioning the hooks to properly meet their respective catch. Also each catch preferably includes an adjusting nut adapted for interconnection between the catch and a hoop-tie band.

In accordance with additional aspects of this invention, the latching system includes first and second guide blocks adapted to attach to surrounding structure such that their placement guides the hoop-tie catches toward the latch assembly hooks. The latching system additionally includes first and second keeper stops adapted to attach to surrounding structure such that their placement stops the hoop-tie catches from traveling further toward the latch assembly hooks.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a latch assembly 20 having two opposing latch hooks 22, 22' operably linked to only one release mechanism. In a closed position, the opposed latch hooks 22, 22' each mate with a corresponding catch 24, 24' attached to the ends of left and right hoop-tie bands 26, 28. Rotation of a handle 30 or other release mechanism causes a simultaneous release of both latch hooks 22, 22' from their respective catches 24, 24'. The embodiment of a latch assembly formed in accordance with the present invention that is described below is an embodiment readily applicable to an aircraft engine aft cowl 14. The present invention latch assembly 20, however, may be used in a variety of circumstances in which it is desired to securely join opposed catches with a single release mechanism.

Figure 3:
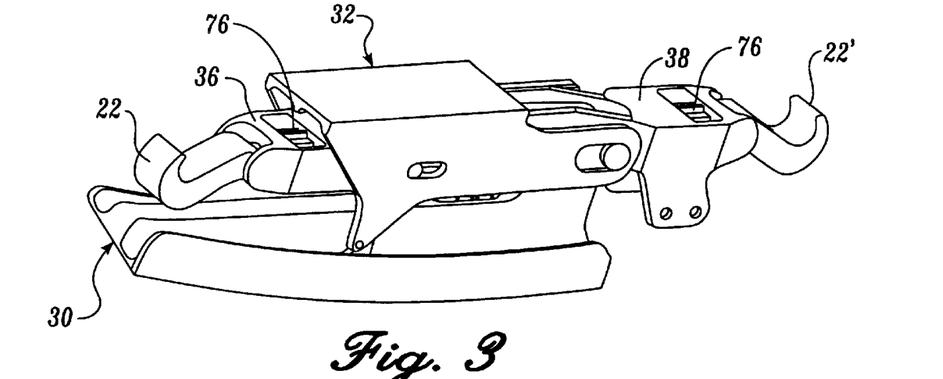
FIG. 3 is a perspective view of a latch assembly formed in accordance with the present invention.
Figure 4:
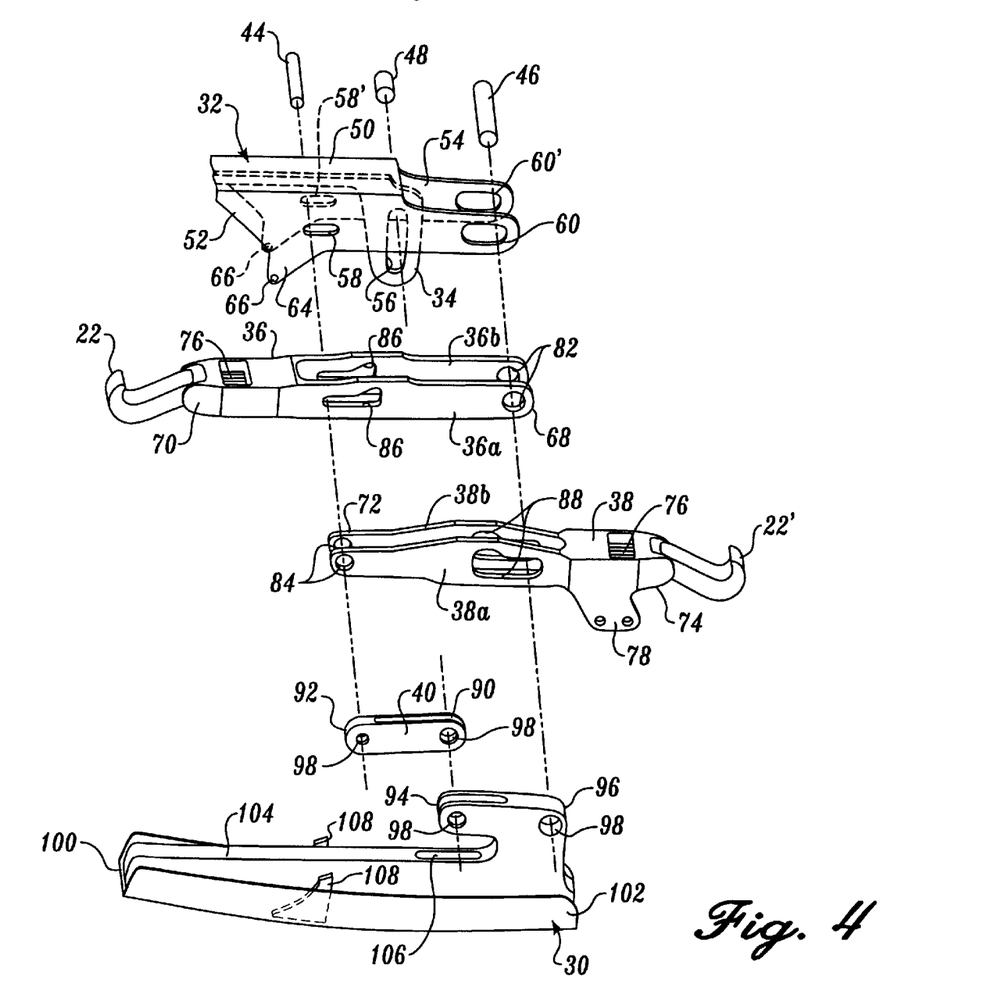
FIG. 4 is an exploded perspective view of the components shown in FIG. 3.

Referring to FIGS. 3 and 4, there shown is one embodiment of a latch assembly 20 formed in accordance with the present invention. In general, the latch assembly 20 includes a housing 32, a stationary center link 34 (shown attached to the housing in this embodiment), left and right elongated links 36, 38, a latch handle 30, first and second intermediate links 40, 42 (the second intermediate link is shown integrally formed with the handle in this embodiment), and various crosspins 44, 46, 48. The distal ends of the elongated links include hooks 22, 22' for engaging opposed catches 24, 24' attached to left and right hoop-tie bands 26, 28. The latch assembly 20 components are movably connected to one another such that rotation of the latch handle causes rotation of both the left and right elongated links, and subsequent release of the catches from the hooks 22, 22'.

In more detail, referring to FIG. 4, the housing 32 includes a lateral plate 50 and fore and aft upright opposed side walls 52, 54 extending downward (relative to the orientation of FIG. 4) from opposite edges of the lateral plate 50. The stationary center link 34 is located in an upright manner approximately midway between the fore and aft upright side walls 52, 54 and parallel thereto. As shown best in FIG. 5, the stationary center link 34 also extends downward from the lateral plate 50 and includes an upright slot 56. Referring back to FIG. 4, each housing upright side wall 52, 54 includes first and second cam slots 58, 60 and 58', 60', respectively. The cam slots are spaced laterally apart on each side wall and are similarly located between side walls.

Figure 5:
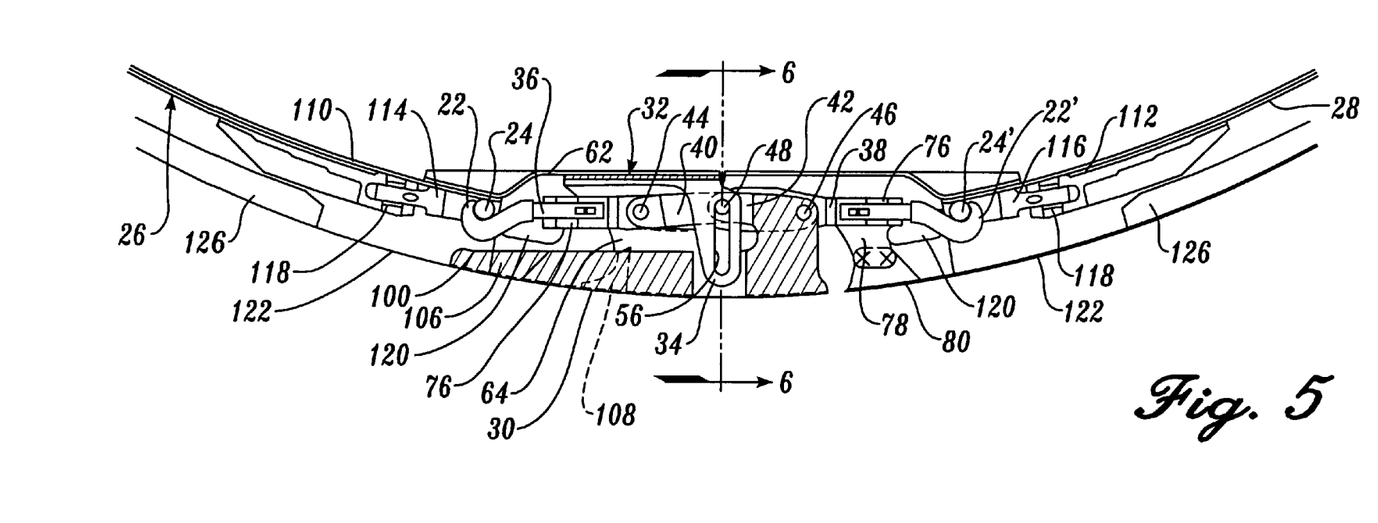
FIG. 5 is a partial cutaway elevational view of the latch assembly of FIG. 4 as installed in an aft cowl.
Figure 6:
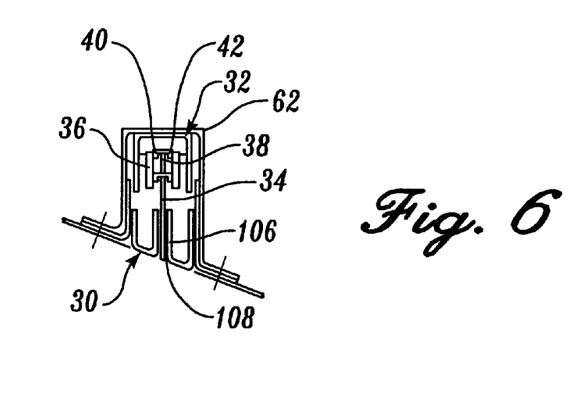
FIG. 6 is a cross-sectional side view taken along line 6—6 in FIG. 5.

Referring to FIG. 5, the housing lateral plate 50 is attached to a rigid frame 62 located within one of the aft cowl halves. Alternatively, the housing may be omitted, the stationary center link may be attached to a pre-existing fixture, and the cam slots may be formed in the pre-existing fixture. In preferred embodiments, the housing 32 is formed of a rigid, wear-resistant material, e.g., steel; the stationary center link 34 is integrally formed with the housing 32; and the cam slots 58, 58', 60, 60' are bored after the housing is formed. Alternative arrangements may be used.

Still referring to FIG. 4, the housing 32 further includes a portion 64 extending from the lower surface of each side wall. Each portion includes a small retaining pin 66 along its inner surface. These retaining pins are useful in snap-fitting the handle into the housing as described below.

Referring to FIG. 4, the left and right elongated links 36, 38 (or more generally, the first and second elongated links) are laterally disposed to extend parallel with the housing upright side walls 52, 54. Each elongated link includes a proximal end 68, 72 and a distal end 70, 74. The distal end of each elongated link includes a hook 22, 22' adjustably attached to the link end via an adjusting nut 76. Rotation of the nut allows the hook to be moved inward and outward with respect to the longitudinal axis of its respective elongated link. The right elongated link preferably includes side extensions 78 projecting from the underside surface of the right link near the its adjusting nut. The side extensions are useful in supporting a cover plate 80 as described below.

The proximal end 68, 72 of each elongated link 36, 38 includes a hole 82, 84 extending transversely through the link. An L-shaped slot 86, 88 is located approximately midway between the proximal and distal ends of each elongated link 36, 38. As shown in FIG. 4, the preferred embodiment of the elongated links 36, 38 includes proximal ends formed as a pair of opposed upright planar arms or prongs 36a, 36b and 38a, 38b. Each arm extends a distance sufficient to include the proximal end hole and the L-shaped slot. As shown best in FIG. 7, the right elongated link 38 is sized in width to nest within the opposed arms 36a, 36b of the left elongated link 36. The left elongated link 38 is sized in width to nest within the upright opposed side walls 52, 54 of the housing 32. Therefore, in the closed position, the combination of the elongated links 36, 38 nests substantially within the housing 32.

Referring back to FIG. 4, the first and second intermediate links 40, 42 each include proximal and distal ends 90, 94 and 92, 96. In the embodiment of FIGS. 3–10, the second intermediate link 42 is integrally formed with the handle 30. As shown in FIG. 4, the first and second intermediate links 40, 42 are significantly shorter in length than either the housing 32 or the elongated links 36, 38. Cross holes 98 are located through each intermediate link end. The intermediate links are preferably formed as solid pieces at their distal ends, transitioning into opposed upright planar arms or prongs 40a, 40b and 42a, 42b at their proximal ends.

Figure 7:
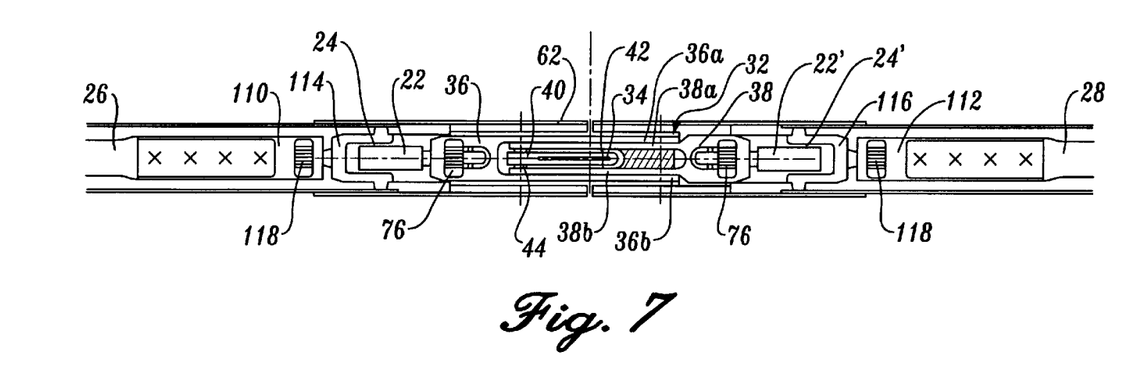
FIG. 7 is a bottom view looking up of the latch assembly of FIG. 5.

Referring to FIG. 7, the stationary center link 34 is positionable within the opposed arms 40a, 40b of the first intermediate link 40 at its proximal end 90. The proximal end of the first intermediate link is sized to nest within the arms of the second intermediate link 42 at its proximal end 94. The combination of the center link 34 and the intermediate links 40, 42 is such that the center link slot 56 aligns with the intermediate link proximal end cross holes 98. In the latch assembly closed position, the combination of the first and second intermediate links 40, 42 nests within the right elongated link 38, which is nested with the left elongated link 36 in the housing 32. As may be appreciated, this arrangement is compact and space efficient.

Referring to FIG. 7, a first crosspin 44 is movably interconnected between the housing first cam slots 58, 58', the left elongated link L-shaped slot 86, the right elongated link proximal hole 84, and the first intermediate link cross hole 98 at its distal end 92. A second crosspin 46 is movably interconnected between the housing second cam slots 60, 60', the left elongated link proximal end hole 82, the right elongated link L-shaped slot 88, and the cross hole 98 of the second intermediate distal end 96. A shorter middle crosspin 48 interconnects between the cross holes of the first and second intermediate link proximal ends 90, 94 holes and the stationary center link upright slot 56.

Referring back to FIG. 4, the handle is an elongated member having first and second ends 100, 102. In the embodiment of FIG. 4, the second intermediate link 42 is integrally formed with the handle at the handle second end 102, the second intermediate link being positioned generally parallel to the longitudinal length of the handle, though, offset a short distance from the handle. The present invention includes alternative arrangements of a release mechanism relative to the links, e.g., a handle may be attached to the first intermediate link in a similar manner, or connected to the middle crosspin such that movement of the handle causes a downward movement of the middle crosspin along the stationary center link upright slot. If a handle is not used, other components should be provided to open and close the latch assembly 20; e.g., the middle crosspin may be moved via an actuation assembly that is initiated by other means. What is important to the present invention, is that the release mechanism should connect to the linking components in a manner that causes rotation of the links to move the hooks 22, 22' relative to their respective catches 24, 24'.

In the embodiment of FIG. 4, the outer surface of the handle is curved slightly in order to conform to the surrounding exterior aft cowl surfaces. The second intermediate link is located on the concave side of the curve. Also shown in FIG. 4, the handle includes a longitudinal structural rib 104 that extends along the inside curve to further support the handle connection to the second intermediate link and to ensure durability of the handle during repeated use. A small bore 106 is provided in the rib to provide sufficient clearance to the stationary center link 34 when the latch assembly is in a closed position. Shown in FIGS. 4 and 5, the handle includes a small notched hook 108 positioned to snap-fit engage with the retaining pins 66 of the housing extending portions 64 when the latch assembly 20 is in the fully closed position.

Referring to FIGS. 5 and 7, the embodiment of the latch assembly described above is for use with a hoop-tie band assembly of an aft cowl on an aircraft turbofan engine. The hoop-tie band assembly includes opposed left and right hoop-tie bands 26, 28, each band including a lower end 110, 112. The upper regions of the bands are configured in a conventional manner to accommodate the configuration and loading requirements of the particular application. Each lower end 110, 112 connects to a hoop-tie keeper 114, 116 having a catch 24, 24'. A keeper adjusting nut 118 is available in each hoop-tie keeper to vary the extension distance of its catch. Within the surrounding cowl structure, it is preferable to include rigid hoop-tie stops 120 at the precise locations required to ensure that the catches 24, 24' go no farther toward the latch assembly 20 than is necessary or desirable. The adjusting nuts on the hoop-tie keepers and the adjusting nuts on the elongated links, in conjunction with the hoop-tie stops, allow independent adjustment of latch preload and hoop-tie pre-load. This is particularly important if there is a possibility that the latch assembly would otherwise place a tension load on the hoop tie bands during the closed latch assembly position, thus potentially stretching the bands and/or loosening the latch assembly.

A smooth removable cover plate 122 on each aft cowl half may be provided to allow easy access to the keeper adjusting nuts 118. In this manner, during the closed position, the catches may be properly positioned to engage the hooks 22, 22' of the left and right elongated links.

There are a number of additional features provided to suit this particular hoop-tie band assembly application. One such feature is shown best in FIG. 5, where an additional cover plate 80 (introduced above) is attached to the side extensions 78, on the underside of the right elongated link (relative to the orientation of FIG. 5.) The additional cover plate 80 allows the right hook 22' to move freely between opened and closed positions without interfering with the surrounding cowl exterior surfaces. The additional cover plate 80 further closes up a large gap that would otherwise be required for handle clearance, thus faring the latch assembly installation and maintaining aircraft aerodynamic smoothness requirements.

Movement of the latch assembly 20 is depicted in FIGS. 5 and 8–10. Starting in the closed position of FIG. 5, the handle 30, the elongated links 36, 38, the intermediate links 40, 42, and the housing 32 are all oriented generally parallel as shown. The elongated link hooks 22, 22' engage their respective catches 24, 24'. The first crosspin 44 is located at the outer most region of the housing first cam slot 58, 58' and at the outermost region of the left elongated link L-shaped slot 86. Likewise, the second crosspin 46 is positioned at the outer most region of the housing second cam slot 60, 60' and at the outermost region of the right elongated link L-shaped slot 88. The middle crosspin 48 is positioned at the upper most region of the stationary center link upright slot 56. The handle 30 is flush with the surrounding cowl exterior surfaces, as are the removable covers 122 and the additional cover 80.

Figure 8:
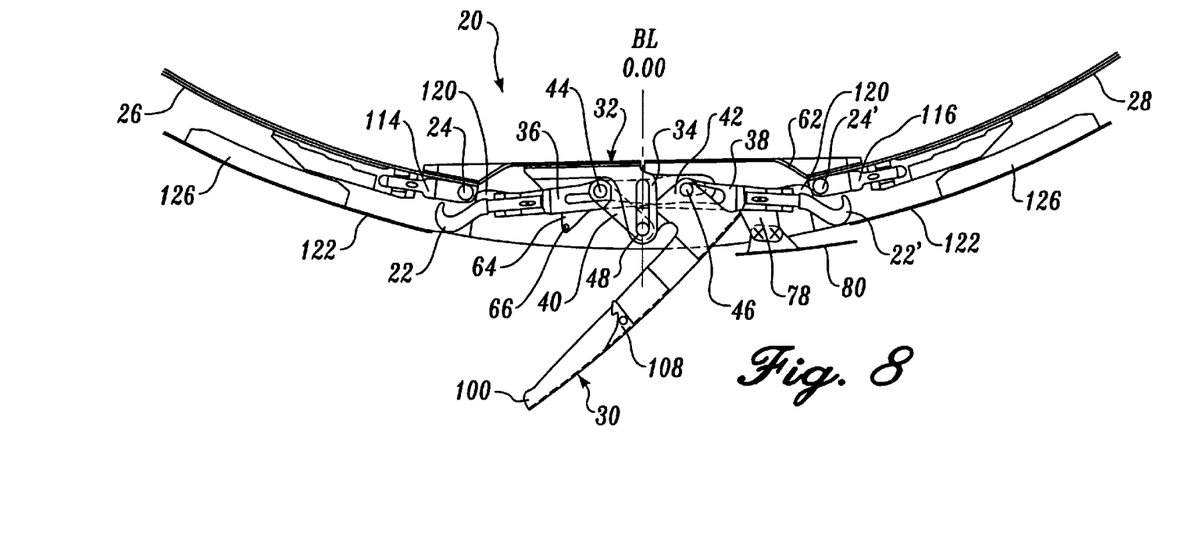
FIG. 8 is a cross-sectional view of the arrangement of FIG. 5 showing the latch open and the aft cowls joined.

Referring to FIG. 8, to initiate opening of the latch assembly 20, the handle first end 100 is pulled downward (relative to the orientation of FIG. 8), and the handle notched hook 108 is snapped out of its engagement with the housing retaining pin 66. This handle movement causes the second intermediate link 42 to rotate about its connection to the second crosspin 46, which additionally causes the second intermediate link 42 to translate the middle crosspin 48 downward, along the stationary center link upright slot 56. Because the middle crosspin 48 is further connected to the cross hole 98 of the first intermediate link proximal end 90, downward movement of the middle crosspin rotates the first intermediate link 40 about its distal end connection to the first crosspin 44.

Still referring to FIG. 8, rotation of the first and second intermediate links 40, 42 further causes inward movement of the first and second crosspins 44, 46. In doing so, the first crosspin 44 translates inward within the left elongated link L-shaped slot 86. Eventually the first crosspin reaches a portion of the L-shaped slot that is slightly higher than the initial portions. Once reached, the left elongated link distal end 92 drops slightly as the left elongated link rotates about its proximal end connection to the second crosspin 46. The first crosspin 44 also translates inward within the housing first cam slot 58, 58', which causes the right elongated link 38 to extend outward slightly.

In a like manner, rotation of the intermediate links 40, 42 causes inward translation of the second crosspin 46 within the right elongated link L-shaped slot 88. Eventually, the second crosspin 46 reaches a portion of the L-shaped slot that is slightly higher than the initial portions. Once reached, the right elongated link distal end 96 drops slightly as the right elongated link rotates about its proximal end connection to the first crosspin 44. The second crosspin 46 also translates inward within the housing second cam slot 60, 60', which causes the left elongated link 36 to extend outward slightly. The extension of the left and right elongated links is advantageous in this particular embodiment because it provides additional clearance between the hooks 22, 22' and the surrounding structure when either cowl is rotated away. This feature may be unnecessary in some applications. Further, the L-shaped slots of the elongated links may be altered in size and shape to provide whatever optimal resulting motion of the hooks is desired.

Figure 9:
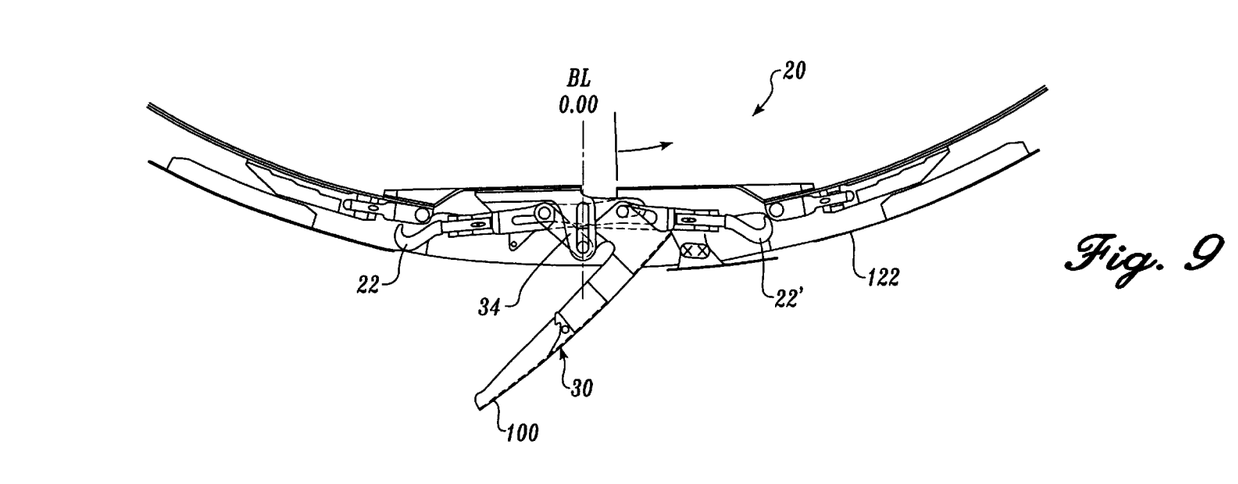
FIG. 9 is a cross-sectional view of the arrangement of FIG. 5 showing the right aft cowl rotated away from center by a small degree amount.
Figure 10:
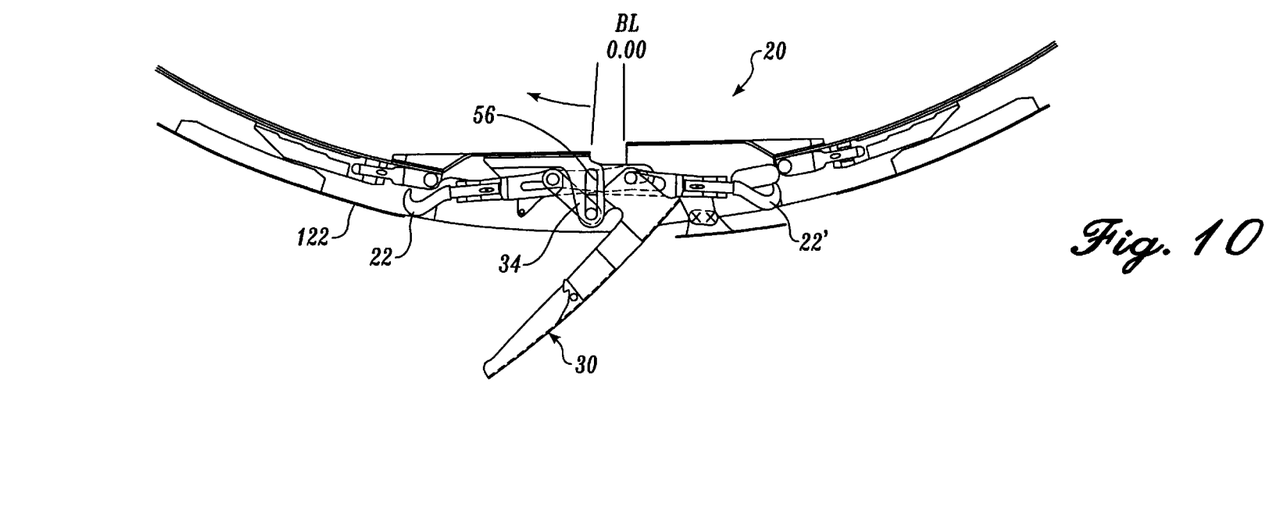
FIG. 10 is a cross-sectional view of the assembly of FIG. 5 showing the left aft cowl rotated away from center by a small degree amount.

The above-described motion has the effect of simultaneously disengaging both hooks from their respective keeper catches for this particular application. Once the latch assembly is open, either thrust reverser half can be opened, either manually or by a conventional actuation system contained within the engine nacelle. FIG. 9 illustrates the position of components when the right cowl is rotated slightly outward from buttline 0.0. FIG. 10 illustrates the position of components when the left cowl is rotated slightly outward. As shown, the hooks 22, 22' easily clear the surrounding cowl structure. Guide blocks 126 are optionally provided to guide the movement of the hoop-tie bands and keepers.

Closing the latch assembly 20 is accomplished by moving the cowl halves together. Once the hoop-tie keepers contact the hoop-tie stops, the handle first end is rotated toward the housing, and verification is made that the hooks engage their respective catches. Moving the handle to this closed position straightens the latch linkage to an over center position. The handle is then snapped into the retaining pins in the housing. The aft cowls are thus closed.

As will be appreciated from a reading of the above, the present invention is a compact latch assembly capable of securely latching opposed catches. In the application of aircraft turbofan engine installations, the present invention may be used to join the opposed halves of a hoop-tie assembly at an aft cowl, thus reducing the number of latches required as compared with known configurations. In this aft cowl application, the present invention further reduces potential damage to the thrust reverser, since any attempt to open the thrust reverser while the latch assembly is still closed will not adversely affect the thrust reverser.

It should be appreciated from the above reading that various modifications may be made to the present invention latch assembly as described above while still staying within the scope of the present invention. In particular, the various assembly members described above are formed with opposing arms that are sized to allow one component to be nested within another. This arrangement is very useful when trying to secure opposed catches that will undergo large loads during use. This nesting arrangement, however, may not need to be used in all circumstances. Alternatively, a designer could simply form each component of a single arm and then stack each arm side by side to form a latch mechanism according to the present invention.

In a like manner, the use of a housing is convenient in order to assemble the latch before installing it into a particular configuration. Alternatively, the latch components could be assembled within a particular environment and the crosspins could be connected to some other structure, for example a pre-existing surrounding flame. What is important to the present invention, is that the pins are arranged to join the assembly components in a manner that will release the catches from the hooks 22, 22' when the middle crosspin is translated downward.

While the preferred embodiment of the invention has been illustrated and described, and while other alternative arrangements have been described, it will be appreciated that yet further changes can be made therein without departing from the spirit and scope of the invention.

The embodiments of the invention in which an exclusive property or privilege is claimed are defined as follows:

1. A latch assembly for securing opposed catches, the latch comprising:
   (a) a housing having an upright side wall, the side wall including first and second cam slots;
   (b) a stationary center link having an upright slot, the center link being connected to the housing such that the upright slot is located approximately mid-way between the housing first and second cam slots;

(c) first and second elongated links each having distal and proximal ends, the distal ends each including a hook, each elongated link further including an L-shaped slot located between the distal and proximal ends;

(d) first and second intermediate links each including distal and proximal ends; and (e) first, second, and middle crosspins; the first crosspin being movably interconnected between the housing first cam slot, the left elongated link L-shaped slot, the right elongated link distal end, and the first intermediate link distal end; the second crosspin being movably interconnected between the housing second cam slot, the right elongated link L-shaped slot, the left elongated link distal end, and the second intermediate link distal end; the middle crosspin being interconnected between the first and second intermediate proximal ends and the stationary center link upright slot;

whereby movement of the middle crosspin along the upright slot causes rotation of the intermediate links and movement of the first and second crosspins in their respective slots further causing rotation of the left and right elongated links as the first and second crosspins transverse their respective L-shaped slots.

2. The latch assembly according to claim 1, further comprising a handle connected to one of the first and second intermediate links, wherein movement of the middle crosspin along the upright slot is initiated by rotation of the one of the first and second intermediate links caused by rotation of the handle.

3. The latch assembly according to claim 2, wherein the handle is integrally formed with the second intermediate link.

4. The latch assembly according to claim 2, wherein the latch assembly includes open and closed positions, and the handle snap-fits into the housing in going from the open to the closed assembly position.

5. The latch assembly according to claim 1, wherein the left elongated link includes opposed arms, portions of the right elongated link being located therein; the right elongated link includes opposed arms, portions of the second intermediate link being located therein; the second intermediate link includes opposed arms, portions of the first intermediate link being located therein; and the first intermediate link includes opposed arms, portions of the stationary center link being located therein.

6. The latch assembly according to claim 5, wherein the housing includes two opposed upright side walls; the elongated links, the intermediate links, and the stationary center link being substantially located therebetween.

7. The latch assembly according to claim 6, wherein the housing includes two opposed upright side walls each having first and second cam slots; the first and second crosspins engaging their respective slots of both upright side walls.

8. The latch assembly according to claim 1, wherein the housing includes two opposed up right side walls each having first a nd second cam slots; the elongated links, the intermediate links, and the stationer center link being substantially located therebetween, with the first and second crosspins engaging their respective slots of both upright side walls.

9. The latch assembly according to claim 1, wherein the first and second elongated links include adjusting nuts connected between the distal ends and their respective hooks, the adjusting nuts for varying the overall length of the elongated link.

10. The latch assembly according to claim 1, wherein movement of the first and second crosspins further causes extension of the second and first elongated links respectively.

11. A latch assembly f or securing opposed catches, the latch comprising:

(a) a housing having opposed upright side wall each including first and second cam slots;

(b) a stationary center link having a upright slot, the center link being connected to the housing such that the upright slot is located approximately mid-way between the housing first and second cam slots;

(c) first and second elongated links each having distal and proximal ends and opposed arms at their proximal ends, portions of the right elongated link being located within the left elongated link opposed arms; the distal ends each including a hook, each elongated link further including an L-shaped slot located between the distal and proximal ends, and a hole located near the proximal end;

(d) first and second intermediate links each including distal and proximal ends and opposed arms at their proximal ends, portions of the second intermediate link being located within the right elongated link opposed arms, portions of the first intermediate link being located within the second intermediate link opposed arms, portions of the stationary center link being located within the first intermediate link opposed arms; the elongated links, the intermediate links, and the stationary center link being substantially located between the housing opposed side walls;

(e) first, second, and middle crosspins; the first crosspin being movably interconnected between the housing first cam slot, the left elongated link L-shaped slot, the right elongated link hole, and the first intermediate link distal end; the second crosspin being movably interconnected between the housing second cam slot, the right elongated line L-shaped slot, the left elongated link hole, and the second intermediate link distal end; the middle crosspin being interconnected between the first and second intermediate proximal ends and the stationary center link upright slot; and (f) a handle connected to one of the first and second intermediate links; wherein movement of the middle crosspin along the upright slot is initiated by rotation of the one of the first and second intermediate links caused by rotation of the handle; whereby movement of the middle crosspin along the upright slot causes rotation of the intermediate links and movement of the first and second crosspins in their respective slots further causing rotation of the left and right elongated links as the first and second crosspins transverse their respective L-shaped slots and causing extension of the second and first elongated links respectively.

12. A latching system for an aircraft hoop-tie assembly having opposed hoop-tie bands, the system comprising:

(a) a latch assembly comprising: a stationary center link having a upright slot; first and second elongated links each having distal and proximal ends, the distal ends each including a hook, each elongated link further including a slot located between the distal and proximal ends; first and second intermediate links each including distal and proximal ends; and first, second, and middle crosspins; the first crosspin being movably interconnected between the first elongated link's slot, the second elongated link's distal end, and the first intermediate link distal end; the second crosspin being movably interconnected between the second elongated link's slot, the first elongated link distal end, and the second intermediate link distal end; the middle crosspin being interconnected between the first and second intermediate proximal ends of the first and second intermediate links and the stationary center link upright slot; and (b) opposed catches for engaging the latch assembly hooks, one being adapted for connection to one hoop-tie band, the other catch being adapted for connection to the other hoop-tie band.

13. The latching system according to claim 12 wherein each elongated links further includes an adjusting nut connected to its respective hooks for positioning the hooks to properly meet their respective catch.

14. The latching system according to claim 12, further comprising first and second guide blocks adapted to attach to surrounding structure such that their placement guides the hoop-tie catches toward the latch assembly hooks.

15. The latching system according to claim 12, further comprising first and second keeper stops adapted to attach to surrounding structure such that their placement stops the hoop-tie catches from traveling further toward the latch assembly hooks.

16. The latching system according to claim 12, wherein each catch includes an adjusting nut adapted for interconnection between the catch and a hoop-tie band.

* * * * *

UNITED STATES PATENT AND TRADEMARK OFFICE
CERTIFICATE OF CORRECTION

PATENT NO.  : 5,915,765
DATED       : June 29, 1999
INVENTOR(S) : J.E. Sternberger It is certified that error appears in the above-identified patent and that said Letters Patent is hereby corrected as shown below:

| COLUMN | LINE | |
|---|---|---|
| Title page | Attorney, Agent, or Firm | "O'Conner" should read --O'Connor-- |
| 9 (Claim 8, | line 2) | "up right" should read --upright-- |
| 9 (Claim 8, | line 3) | "a nd" should read --and-- |
| 9 (Claim 8, | line 4) | "stationer" should read --stationary-- |
| 10 (Claim 11, | line 1) | "f or" should read --for-- |
| 11 (Claim 12, | line 12) | "link's distal" should read --link distal-- |

Signed and Sealed this

Twenty-first Day of December, 1999

*Attest:*

*Attesting Officer*

Q. TODD DICKINSON

*Acting Commissioner of Patents and Trademarks*